US012440941B1

(12) United States Patent
Aspauza

(10) Patent No.: US 12,440,941 B1
(45) Date of Patent: Oct. 14, 2025

(54) SPINNING BIT AND STORAGE TANK ADAPTOR FOR POWER TOOLS

(71) Applicant: Alexa Aspauza, Newark, NJ (US)

(72) Inventor: Alexa Aspauza, Newark, NJ (US)

( * ) Notice: Subject to any disclaimer, the term of this patent is extended or adjusted under 35 U.S.C. 154(b) by 0 days.

(21) Appl. No.: 18/121,935

(22) Filed: Mar. 15, 2023

(51) Int. Cl.

| | |
|---|---|
| ***A47L 11/162*** | (2006.01) |
| ***A47L 11/14*** | (2006.01) |
| ***B24B 23/02*** | (2006.01) |
| ***B24B 29/00*** | (2006.01) |
| ***B25F 1/02*** | (2006.01) |

(52) U.S. Cl.
CPC ............ *B24B 23/02* (2013.01); *A47L 11/145* (2013.01); *A47L 11/1625* (2013.01); *B24B 29/005* (2013.01); *B25F 1/02* (2013.01)

(58) Field of Classification Search
CPC ........................... A47L 11/085; A47L 11/1625
USPC ..................................... 401/207, 291; 15/29
See application file for complete search history.

(56) References Cited

U.S. PATENT DOCUMENTS

| | | | | |
|---|---|---|---|---|
| 4,383,345 A * | 5/1983 | Alexander | B24B 23/02 15/97.1 |
| 2009/0124184 A1 * | 5/2009 | Greer | B24B 23/02 451/449 |

FOREIGN PATENT DOCUMENTS

| | | | |
|---|---|---|---|
| DE | 2553194 A * | 6/1977 | A47L 11/34 |

OTHER PUBLICATIONS

Translation of DE2553194A1 (Year: 1977).*

* cited by examiner

*Primary Examiner* — Tom Rodgers
(74) *Attorney, Agent, or Firm* — Joshua Kaplan, Esq; Kaplan Law Practice LLC

(57) ABSTRACT

The disclosure teaches a scrubbing or buffing or cleaning adapter for use with power tools. The adapter is made of a storage tank or container. The storage tank is designed to be filed with a liquid solution. The liquid solution may be a detergent, soap, plain water, a buffing compound or any other liquid solution. The liquid solution is poured into the storage tank prior to usage through a refill opening or an outlet opening. The outlet opening preferably contains a pump or suction mechanism that is configured to transfer the liquid solution from the tank into the hose. The hose then channels the liquid solution to a spout or an inlet spout of a spinning attachment. The suction or pump mechanism is powered by an onboard power supply and is operated electronically through a switch or manually through a crank handle).

7 Claims, 9 Drawing Sheets

FIG. 9A
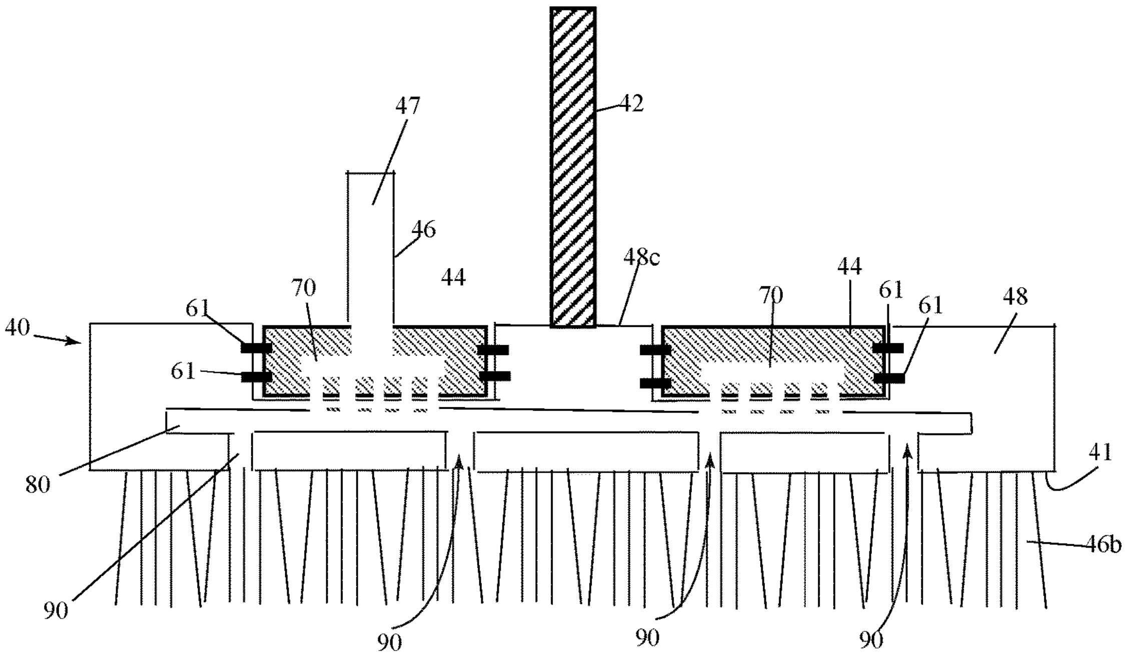
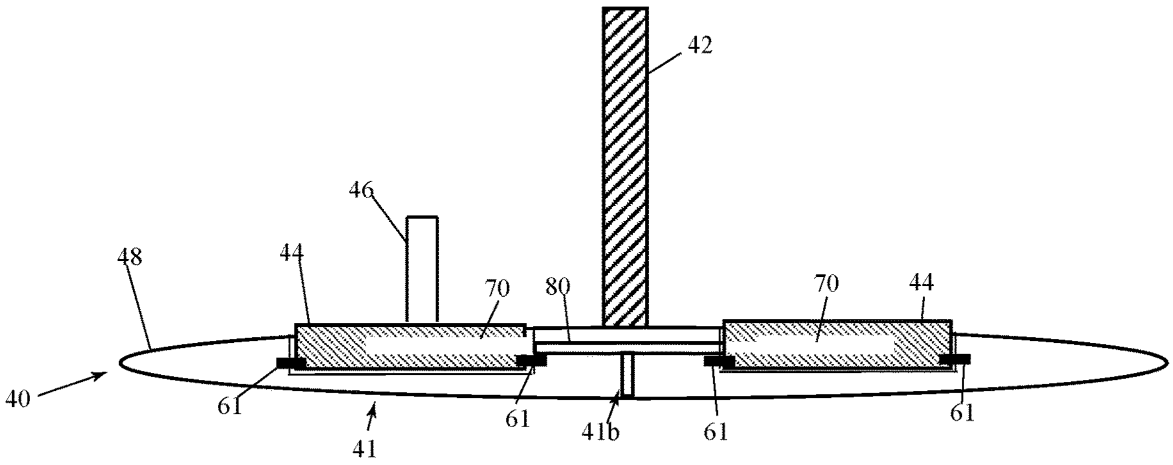
FIG. 9B

SPINNING BIT AND STORAGE TANK ADAPTOR FOR POWER TOOLS

FIELD OF THE INVENTION

The present invention relates to an adaptor for use in cleaning, scrubbing, buffing or polishing, in particular to an adapter capable of converting a power tool into a surface cleaning or buffing tool.

BACKGROUND OF THE INVENTION

One of the most elementary underlying concepts of carpet cleaning or surface buffing is intensive and repeated passage of material over a target area. The material may be fabric, a wire mesh or brush bristles. A desired end result is achieved by rubbing the surface area many times using a scrubbing of materials to either dislodge dirt and other matter or achieve a desired sheen.

For best results the buffeting or brushing is augmented with a water spray that preferably also contains a cleaning solution. In a polishing scenario the buffeting is supplemented by a shine or varnish. In a cleaning scenario the constant scrubbing is provided by one or more rotating brushes or rollers with rotating wire mesh or fabric, with a jet of liquid cleaning solution infused into to the rotating brush.

A plethora of electrically driven mechanical devices exist to effectuate both cleaning and buffing activities. Both concepts using dedicated mechanical devices employing rotating brushes or rollers. The obvious downside of this approach is that a dedicated device is required to achieve a single end. Such device carries a cost of both acquisition and operation, as well as storage. Therefore, it is highly useful to have a generic mechanical device, such as a drill or a

SUMMARY OF THE INVENTION

It is the object of the present disclosure to describe a new and non-obvious that is able of converting a handheld power tool into a scrubbing, buffing or brushing tool.

It is another object of the present disclosure to describe a combination of item designed to store a measure of liquid, the measure of liquid is configured to be channeled to the work area through a power tool bit attachment.

It is still another object of the present disclosure to describe a new scrubbing, buffing or brushing tool that can be securely attached onto a handheld power tool.

It is still another object of the present to describe a device were a liquid stored in a storage tank that is strapped onto the body of a handheld power tool is fed to a spinning bit attached to the rotating chuck of the handheld tool, and where a liquid solution is then configured to flow from the storage tank to the spinning bit to provide a measure of buffing compound, a cleaning compound or a liquid to the work area on which the spinning bit is operating.

The disclosure teaches a scrubbing or buffing or cleaning adapter for use with power tools. The adapter is made of a storage tank or container. The storage tank is designed to be filed with a liquid solution. The liquid solution may be a detergent, soap, plain water, a buffing compound or any other liquid solution. The liquid solution is poured into the storage tank prior to usage through a refill opening or an outlet opening. The outlet opening preferably contains a pump or suction mechanism that is configured to transfer the liquid solution from the tank into the hose. The hose then channels the liquid solution to a spout or an inlet spout of a spinning attachment. The suction or pump mechanism is powered by an onboard power supply and is operated electronically through a switch or manually through a crank handle).

The spinning attachment, or a spinning power tool bit, is made of two portions a spinning portion and a static portion. The spinning portion and stating portion are in rotating association within each other where the static portion is embedded within the spinning portion and permits the spinning portion to rotate around it. The spin of the spinning portion is induced by a rearward rod that is centrally mounted along the inner surface of the spinning portion and which is mounted inside a spinning chuck of the power tool.

The spout connects to the static portion and contains a channel that connects to internal first ducts of the static portion. The ducts may connect to a outlet opening of the outer surface of the spinning portion, or may be in communication with second ducts of the spinning portion, which in turn connect to the opening along the outer surface.

The adapter is capable of converting an existing power tool, such as a power screw driver, impact driver, drill, or a buffing tool into a carpet cleaner, a high powered duster or scrubber or a surface polishing and buffing tool. The conversion is enabled by attaching the storage tank for storing a liquid solution onto an existing power tool. The shank of the power tool, or the rotational element that is configured to accept rotating bits is then fitted with an attachment bit. This spinning attachment is comprised of a spinning portion and a non-spinning, static portion, embedded within the spinning portion. The stating portion contains a spout to which a hose from the storage tank is attached. The hose is also used to keep the static portion from spinning.

The liquid from the tank is channeled through the hose to the spout. The channel inside the spout is in communication with the ducts inside the static portion, which in turn feed the ducts within the rotating or the spinning portion and are then propelled outward to the outward surface of the spinning attachment, to be applied onto the work surface. A bypass mechanism preferably is used to extract the liquid solution from the storage tank and propel it along the hose and through the spinning attachment. One possible mechanism that can be used as a bypass mechanism is a motor that is used to drive washer fluids in vehicles through the ductwork through the windshield wipers.

BRIEF DESCRIPTION OF THE DRAWINGS

FIGS. 9A and 9B demonstrating a cutaway of the internals of the spinning attachment.

DESCRIPTION OF THE PREFERRED EMBODIMENTS

Figure 1:
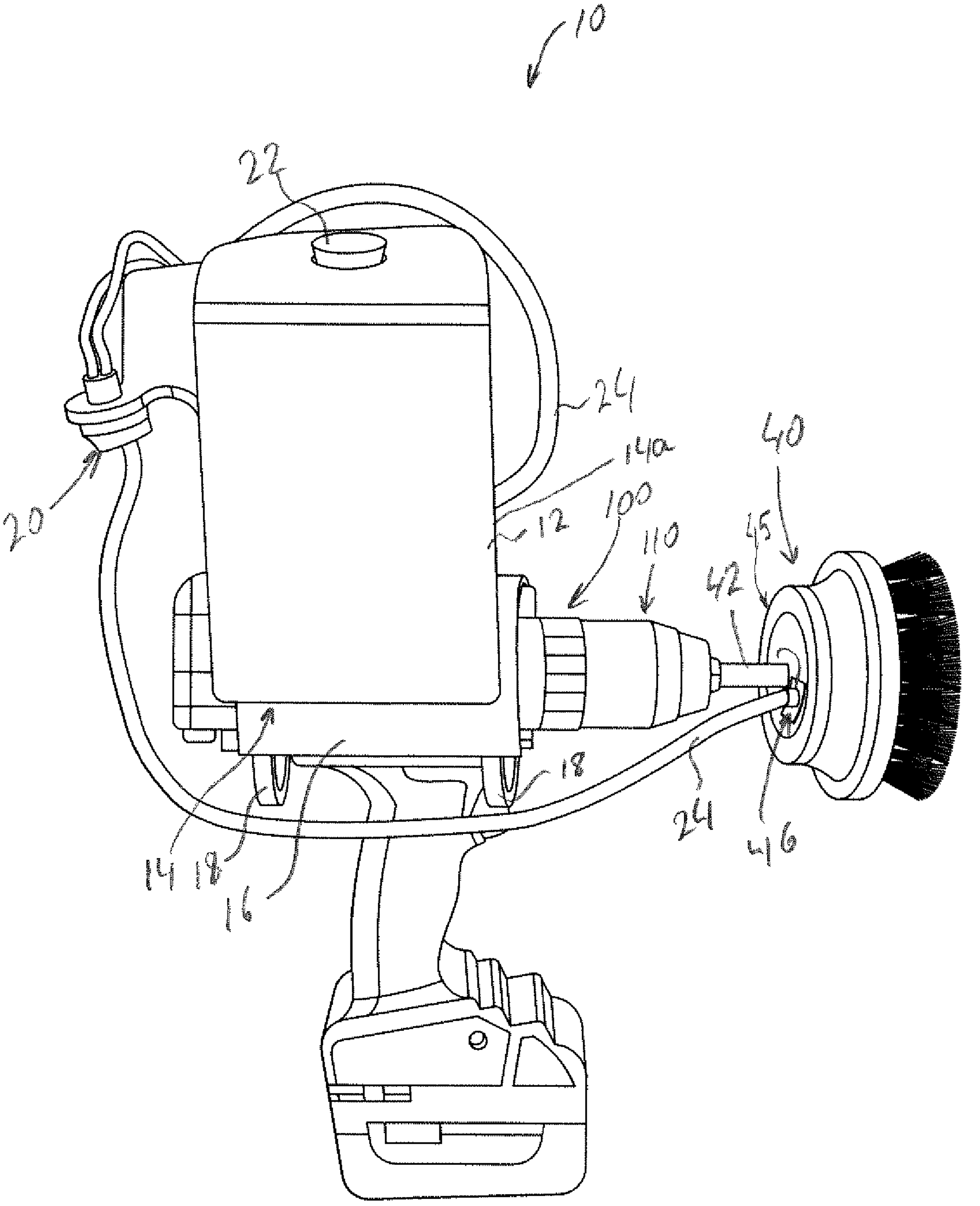
FIG. 1 is a side diagram of the adapter mounted onto a power tool, with a spinning attachment attaching to the shank of the power tool and connecting to the storage tank via a hose.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Turning now descriptively to the drawings, and in particular to FIG. 1 well as to other and rest of the disclosed figures, in which similar reference characters denote similar elements throughout the several views, the figures illustrate an adapter 10, showing a storage tank 12, mounted on a body of a power tool 100, in this case a drill. The bottom wall 14 of the storage tank 12 is attached to a mounting gasket 18 using a harness 18, in this case a pair of straps. A hose 24 is showing existing a front wall 14*a* and passing through a bypass motor 20. A bypass motor 20 that may be employed in this scenario may be analogous to a motor used in vehicles to pump window washing fluid from a storage tank and propel it through duct work towards windshield wipers, and out through outlet openings onto a windshield.

A spinning bit 40 or spinning attachment connects to the rotating shank 110 of the power tool 100 via a rearwardly extending rod 42. The rod 42 extends from the inner surface 45. Adjacent to the rod 42 is the intake spout 46 connected to the second end 25 of the hose 24, with the first end 23 being inside the storage tank 12. The spinning attachment 40 is comprised of the spinning portion 48 and a static portion 44.

Figure 2:
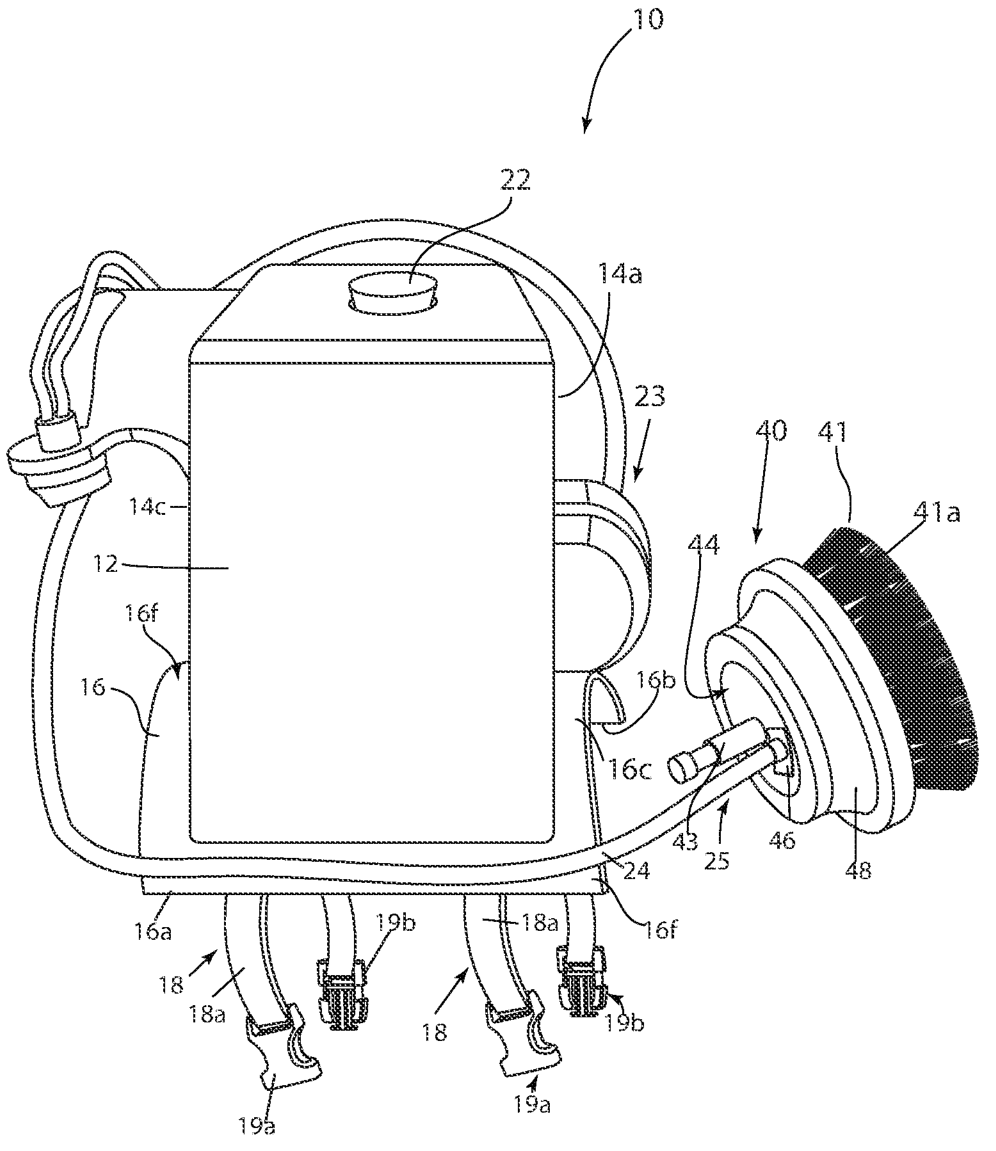
FIG. 2 is a side diagram of the adapter showing a spinning attachment attaching to the shank of the power tool and connecting to the storage tank via a hose.

FIG. 2 demonstrates the adaptor 10 showing the gasket 16. The gasket 16 contains two parallel edges 16*a* and 16*b*. It is preferable that the edges 16*a* and 16*b* are made from flexible materials. The top surface 16*c* is preferably padded to absorb vibrations coming from the power tool. FIG. 2 details the harness 18 comprised from belts 18*a* that are secured below the body of the power tool 100 with buckle elements 19*a* and 19*b*. The buckle elements shown are side squeeze buckle having a female end 19*a* and a male end 19*b*. Appreciably, other buckle forms, such as hook and loop and key and tongue as well as bayonet and clasp buckles are also possible.

The rod 42 is shown as a standard rod for attaching any bit to a shank 110 of a power tool. The rod 42 will rotate with the shank 110, rotating the outer surface 41, which is shown in FIG. 2 as comprising bristles 41*a*. Adjacent to the rod 42 is the spout 46 which accepts the second end 25 of the hose 24. The spout 46 is held in place by the hose 24 and does not rotate with the rest of the spinning portion 48.

Figure 3:
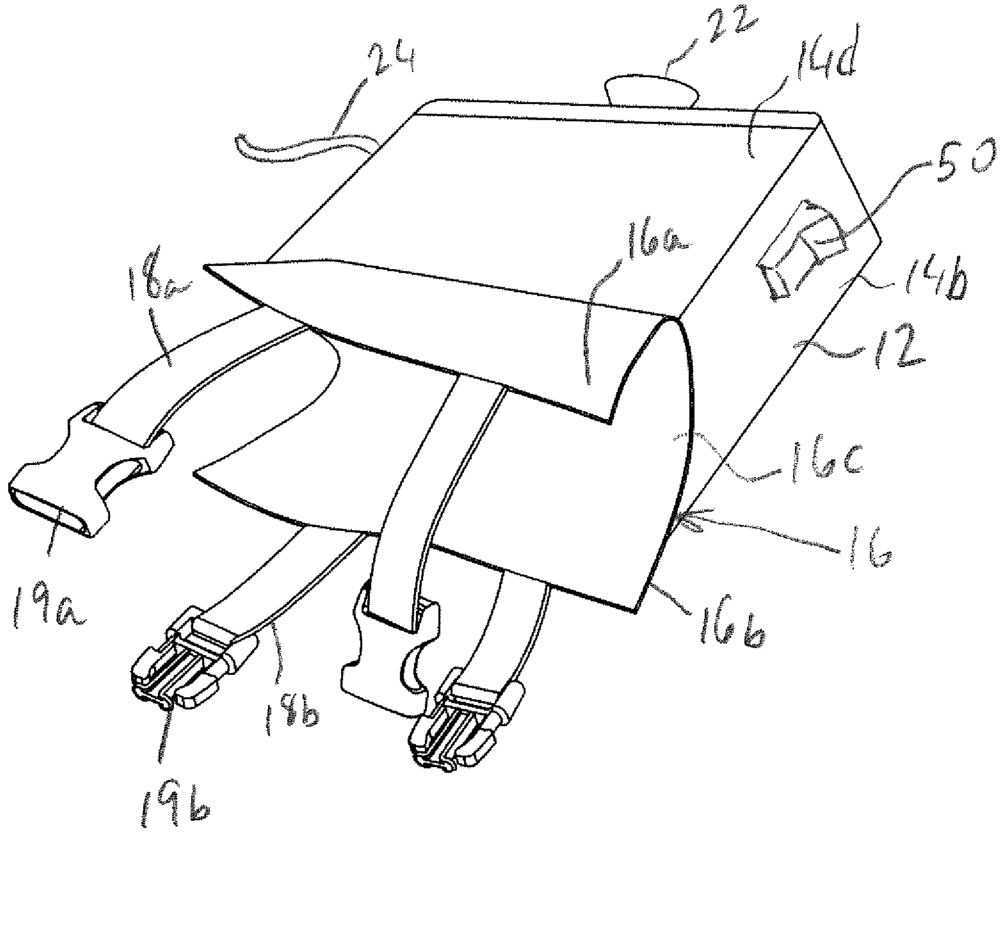
FIG. 3 shows a closeup of the mounting gasket attaching to the bottom wall of the storage tank.

FIG. 3 demonstrates another angle of the storage tank 12 with the mounting gasket 14. The storage tank 12 further comprises a switch 50. The switch 50 operates the motor assembly 20 (FIGS. 1 and 2). The switch 50 may be disputed an the back wall 14*b* or sidewalls 14*d*. A further fill opening with lid 22 may be disposed anywhere along the storage tank 12 and is utilize the refill the tank with a liquid solution. Also shown are parallel edges 16*a* and 16*b* having harness straps 18*a* extending forward from the edge. The upper portion 16*c*, and certainly the entire surface of the mounting gasket 16 is preferably made from supple and insulating materials, such as resin, plastic, silicone or rubber, to insulate the liquid within the storage container 12 from the sparks that may be generated from a power tool 100. To this end, it is preferable to have front and back extensions 16*f* (FIG. 2) extending beyond the front wall 14*a* and back wall 14*b*.

Figure 4:
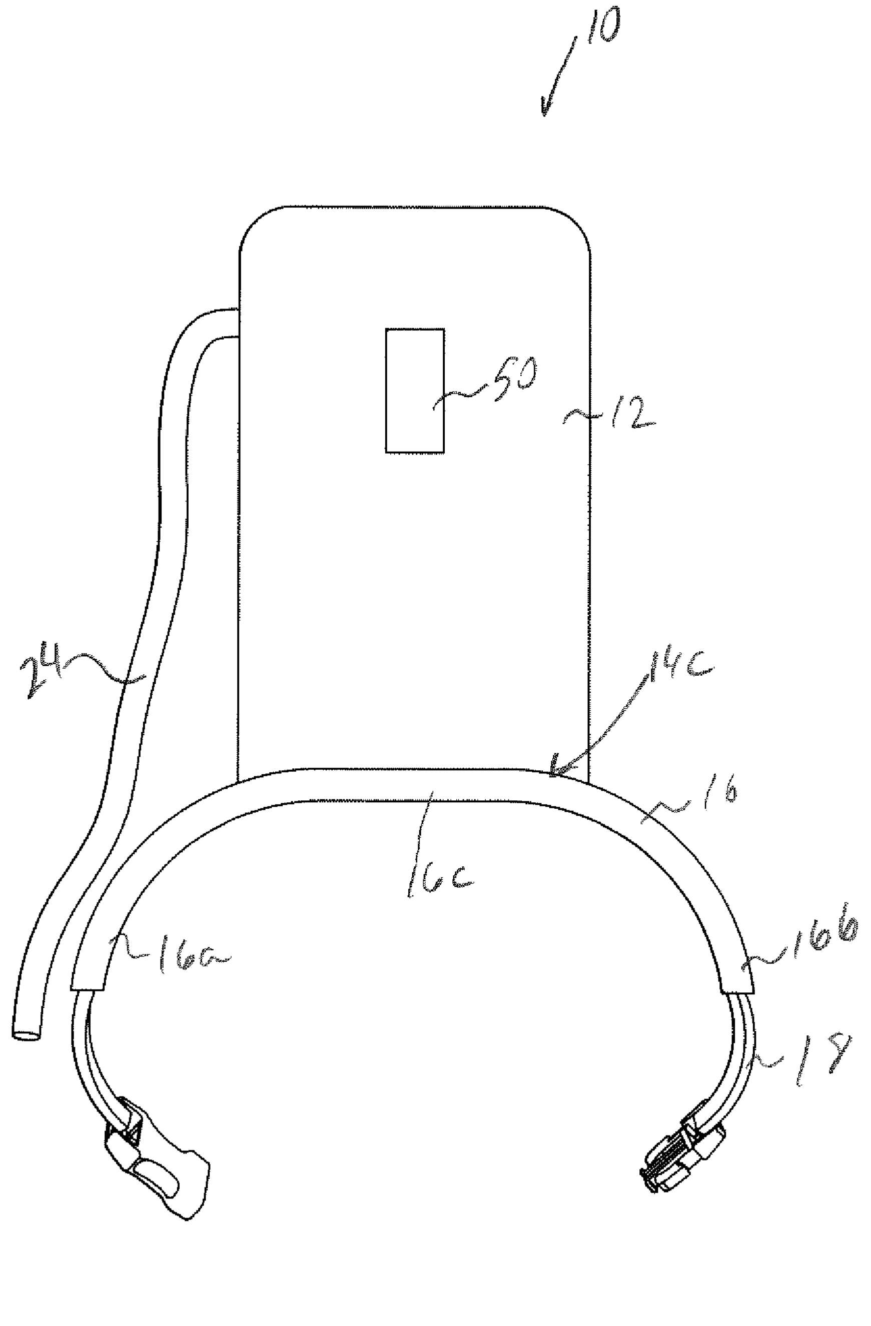
FIG. 4 shows a back view of the mounting gasket.

FIG. 4 demonstrates another embodiment of the described adapter 10. Shown is the storage tank 12 the switch 50, the mounting gasket 16, which is mounted at the bottom wall 14*c*. The mounting gasket 16 is preferably semicircular to better achieve a snug fit around a power tool. However, other shapes, such as a more angular embodiment may be included. Furthermore, a mounting gasket may consist only of the top portion 16*c* without one or both of the side edges 16*a* and 16*b*.

Figure 5:
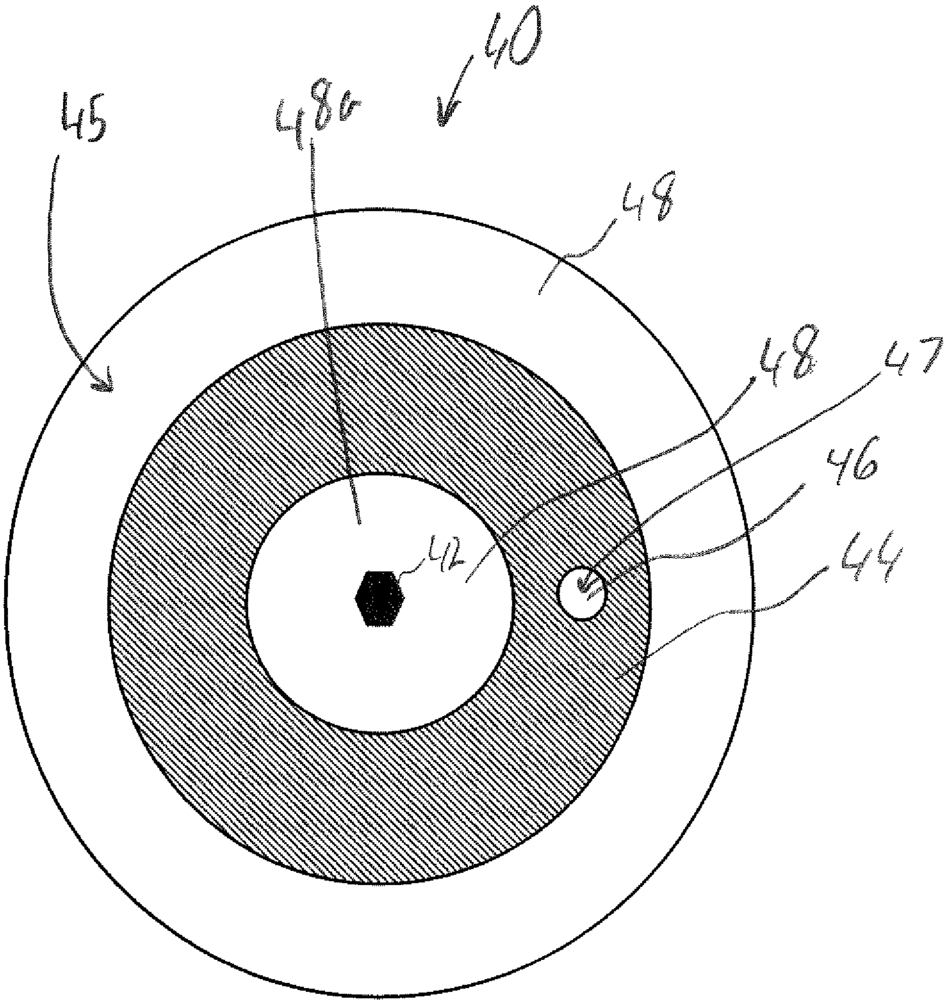
FIG. 5 is a back view of the spinning attachment.
Figure 6:
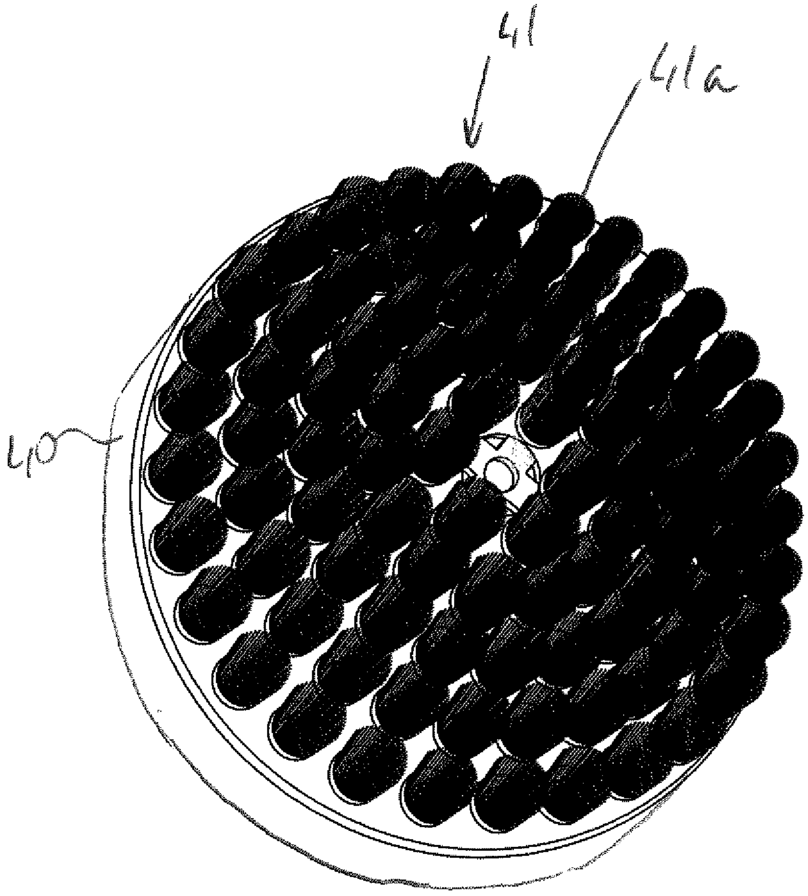
FIG. 6 is a front view of the spinning attachment showing a central channel.

The back surface 45 of the spinning attachment 40 is shown in FIG. 5, while the front surface 41 is shown in FIG. 6. The outer band and the inner circle form the spinning portion 48 that rotates independently of the static portion 44. The inner ring 48*a* may be limited to the rod 42 as shown in FIG. 2. While the static portion 44 is not precluded from rotation, it is generally held in place when the spout 46 is connected to a hose 24, but will spin freely at the same or similar revolution rate as the static portion 48. Visible within the spout 46 is the channel 47 that transmits the liquid solution from the hose 24 into the body of the spinning attachment 40. The bristles are shown forming the outer surface of the spinning attachment 41, with outlet openings 41*b* visible in the center of the outer surface 41.

Figure 7:
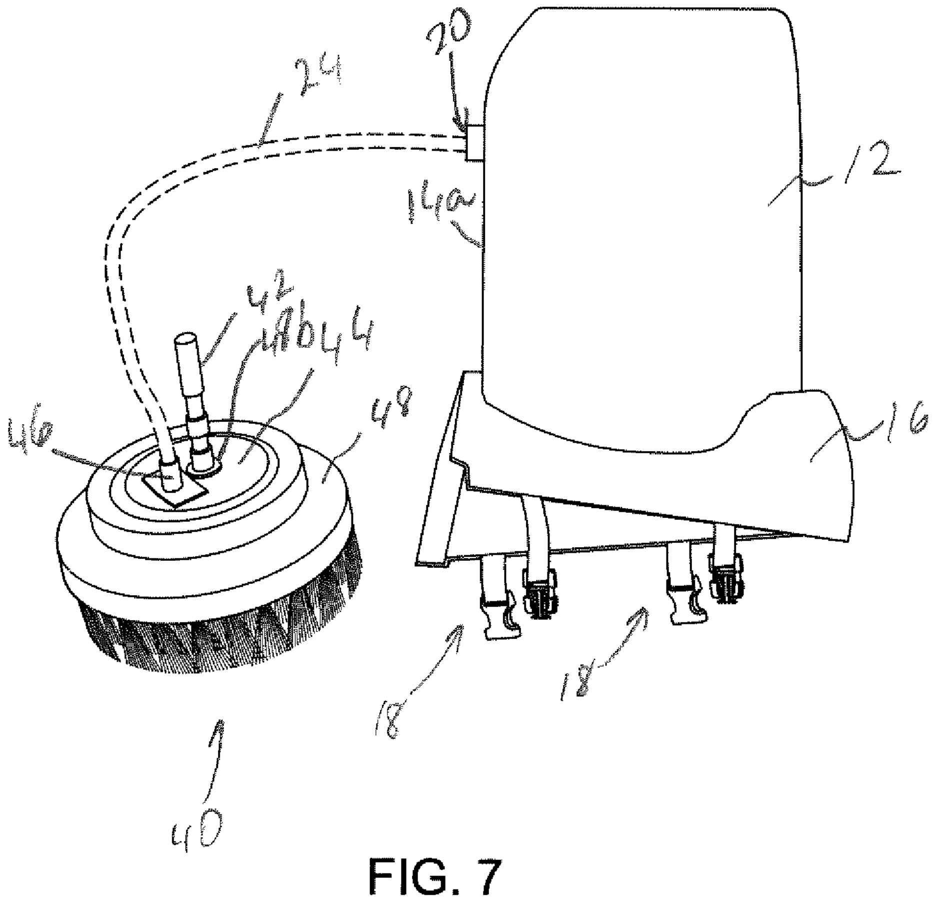
FIG. 7 is an alternative embodiment of the tack demonstrating the hose issuing from the front portion of the storage tank.

FIG. 7 demonstrates an alternative embodiment of the adapter 10 showing the storage tank 12, the mounting gasket 16 and the harness 18. The spinning attachment 40 is shown with the spinning portion 48 being a stepped brush with a small inner ring 48*b* having a rod 42 extending rearward (upward) from the inner ring 48*b*. The spout 46 connecting within the static portion 44 to the hose 24. The hose 24 is shown issuing from the front wall 14*a*, with the bypass motor 20 to extract the liquid solution from the tank and through the hose 24, shown submerged within the cavity of the tank 12.

Figure 8:
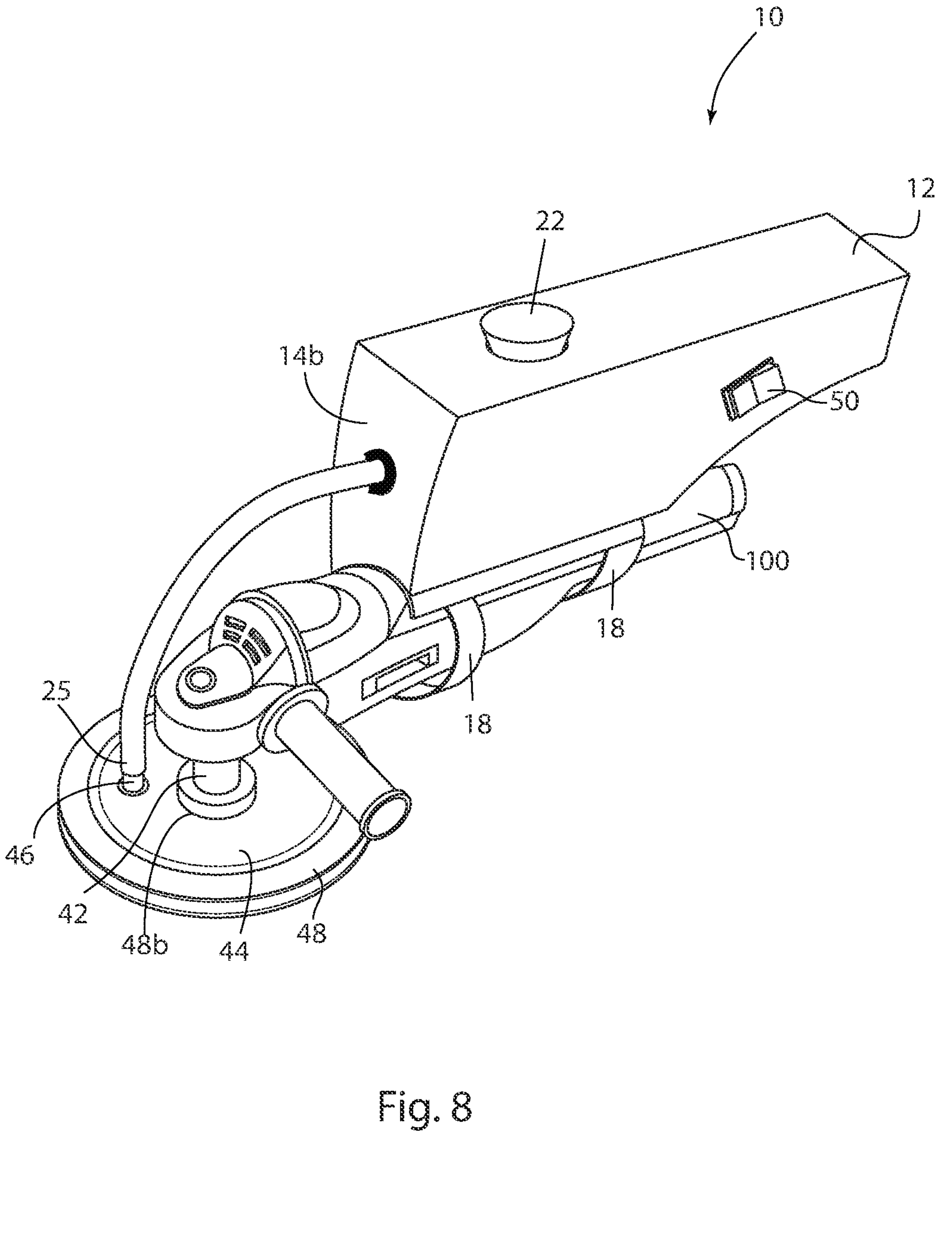
FIG. 8 is another embodiment of the adapter showing a different style storage tank attaching to a buffing power tool.

FIG. 8 demonstrates the adapter 10 mounted on a power tool 100 with harness 18. FIGS. 1-8 generally showed the storage tank as a cuboid. However, as shown in FIG. 9 the storage tank 12 may be produced in a plurality of shapes to best fit the purpose. These may be circular elliptical parallelogrammatic, trapezoidal or as a leaning parallelogram. The tank 12 is shown attached to a buffing tool with the spinning portion 48 forming a band around a static portion 44, with an additional spinning portion forming a central ring 48*b* housing the rod 42. The hose 24 issues from the front wall 14*b*, with the second end 25 attaching to the spout 46.

FIGS. 9A and 9B demonstrates the cross section of the spinning bit 40. FIG. 9A shows a brush spinning bit 40, while FIG. 9B demonstrates a buffing attachment. The static portion 44 is shown encased within the spinning portion 48. With the static portion 44 and the spinning portions 48 and 48*c* in a rotational association through a ball bearing connection 61. The spout 46 contains a channel 47 which is in communication with first ducts 70. The first ducts 70 are in communication with the second ducts 80, which then channel a liquid solution outward through the outlet openings 90. FIG. 9B demonstrates a slightly different configuration, with the first ducts 70 communicating with a central duct 41*b* through the first ducts 70 and into the second duct 80. The adapter 10 may be used for heavy duty scrubbing, such as cleaning carpeting, upholstery and masonry, as well as with more gentle applications, such as buffing and polishing. In each case the liquid solution channeled through first ducts 70 and into the second ducts 80 and into a plurality of outlet openings 90 or a strategically placed central opening 41*b* or a combination of openings. The spinning attachment 40 may also contain a valve to open or close some of the openings 90 or 41*b*, and to vary pressure and rate of liquid delivery to the outer surface 41.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

What is claimed:

1. A scrubbing or buffing or cleaning adapter for power tools comprising;

a storage tank, said storage tank configured to store a quantity of liquid solution; said storage tank comprising at least one resealable opening;

a mounting gasket, two parallel walls said two parallel walls forming the mounting gasket, wherein a top surface of said mounting gasket attaching to a bottom wall of said storage tank, and wherein a bottom surface of said mounting gasket configured to be mounted onto the power tool; said mounting gasket further comprising a coupling harness, said harness configured for fastening said storage tank to a power tool; and a hose, said hose having a first end and a second end; said first end channeling a quantity of said liquid solution from said tank to said second end; said second end connecting to an intake spout of a spinning attachment;

wherein said spinning attachment is configured to be coupled to said power tool with a rod; said spinning attachment having a spinning portion encasing a static portion, on the inner diameter and outer diameter of the static portion; such that said spinning portion and said static portion are co-axially aligned in a horizontal plane with respect to each other; and wherein said intake spout is connected to said static portion, and is parallel to the rod; wherein said static portion is connected-to said spinning portion by a plurality of ball bearings; and wherein said static portion has a plurality of ducts to channel the liquid solution.

2. The scrubbing or buffing or cleaning adapter for power tools of claim 1; wherein said storage container further comprises a pump mechanism, said pump mechanism activated via an exterior switch.

3. The scrubbing or buffing or cleaning adapter for power tools of claim 2; wherein said spinning attachment further comprising a spinning portion and said static portion; wherein said static portion having said rod protruding from a back surface of said static portion, said rod configured to be secured within a chuck of the power tool.

4. The scrubbing or buffing or cleaning adapter for power tools of claim 3; wherein a quantity of said solution being fed into said intake spout being channeled through said plurality of ducts within said static portion and wherein said plurality of ducts channeling said solution to a plurality of second ducts within the spinning portion.

5. The scrubbing or buffing or cleaning adapter for power tools of claim 3; wherein an outer surface of said static portion further comprises a plurality of bristles, a padded surface or a fabric.

6. The scrubbing or buffing or cleaning adapter for power tools of claim 5; wherein an outer surface of said spinning portion is further comprised of an outlet port.

7. The scrubbing or buffing or cleaning adapter for power tools of claim 1; wherein said spinning attachment further comprising a spinning portion and said static portion; wherein said stating portion having said protruding from a back surface of said static portion, said rod configured to be secured within a chuck of the power tool.

* * * * *